(12) United States Patent
Otsuka

(10) Patent No.: US 9,406,118 B2
(45) Date of Patent: Aug. 2, 2016

(54) STAIN IMAGE COLOR CORRECTING APPARATUS, METHOD, AND SYSTEM

(71) Applicant: OLYMPUS CORPORATION, Tokyo (JP)

(72) Inventor: Takeshi Otsuka, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 369 days.

(21) Appl. No.: 13/904,647

(22) Filed: May 29, 2013

(65) Prior Publication Data

US 2013/0259334 A1    Oct. 3, 2013

(30) Foreign Application Priority Data

Nov. 29, 2010   (JP) .................................. 2010-265532

(51) Int. Cl.
   *G06K 9/00*    (2006.01)
   *G06T 7/00*    (2006.01)
   *G06T 5/00*    (2006.01)

(52) U.S. Cl.
   CPC ............... *G06T 7/0012* (2013.01); *G06T 5/008* (2013.01); *G06T 2207/10024* (2013.01); *G06T 2207/10056* (2013.01)

(58) Field of Classification Search
   CPC ................... G06T 7/0012; G06T 2207/10056; G06T 2207/30024; G06T 2207/30096; G06T 7/408; G06K 9/00127; G06K 9/0014; G01J 3/2823; G01J 3/2826; G01J 2003/1213
   See application file for complete search history.

(56) References Cited

U.S. PATENT DOCUMENTS

| 2003/0138140 A1 | 7/2003 | Marcelpoil et al. |
| 2010/0189321 A1* | 7/2010 | Otsuka .......................... 382/128 |

FOREIGN PATENT DOCUMENTS

| JP | 2004-286666 A | 10/2004 |
| JP | 2005-516188 A | 6/2005 |

(Continued)

OTHER PUBLICATIONS

Niethammer et al., "Appearance Normalization of Histology Slides", Sep. 20, 2010, Springer-Verlag, Machine Learning in Medical Imaging 2010, LNCS 6357, p. 58-66.*

(Continued)

*Primary Examiner* — Stephen R Koziol
*Assistant Examiner* — Timothy Choi
(74) *Attorney, Agent, or Firm* — Scully, Scott, Murphy & Presser, P.C.

(57) ABSTRACT

Provided is an image processing apparatus including: a characteristic amount calculator for calculating a first characteristic amount for each pixel constituting a stained sample image; a component ratio calculator for calculating a component ratio of constituent elements in a target pixel, based on the calculation results; a reference value storage portion for storing a reference value of a second characteristic amount of each of the constituent elements; a constituent element correction coefficient calculator for calculating a constituent element correction coefficient, based on the reference value and the second characteristic amount of each of the constituent elements; a target pixel correction coefficient calculator for calculating a target pixel correction coefficient, based on the component ratio and the constituent element correction coefficient thus calculated; and a characteristic amount corrector for correcting the second characteristic amount, based on the calculation results.

10 Claims, 13 Drawing Sheets
(1 of 13 Drawing Sheet(s) Filed in Color)

(56) References Cited

FOREIGN PATENT DOCUMENTS

| | | |
|---|---|---|
| JP | 2009-014355 A | 1/2009 |
| JP | 2010-156612 A | 7/2010 |
| JP | 2010-169596 A | 8/2010 |
| WO | WO 2006/129442 | 12/2006 |

OTHER PUBLICATIONS

Abe et al., "Color Correction of Pathological Images for Different Staiing-condition Slides", Jun. 29, 2004, IEEE, Proceedings 6th Int. Workshop on Enterprise Networking and Computing in Healthcare Industry 2004, p. 218-223.*

Bar-Hillel et al., "Learnin a Mahalanobis Metric from Equivalence Constraints", Jun. 2005, Journal of Machine Learning Resarch 2005, vol. 6, p. 937-965.*

International Search Report dated Feb. 28, 2012 issued in PCT/JP2011/077443.

* cited by examiner

FIG. 4
(a)
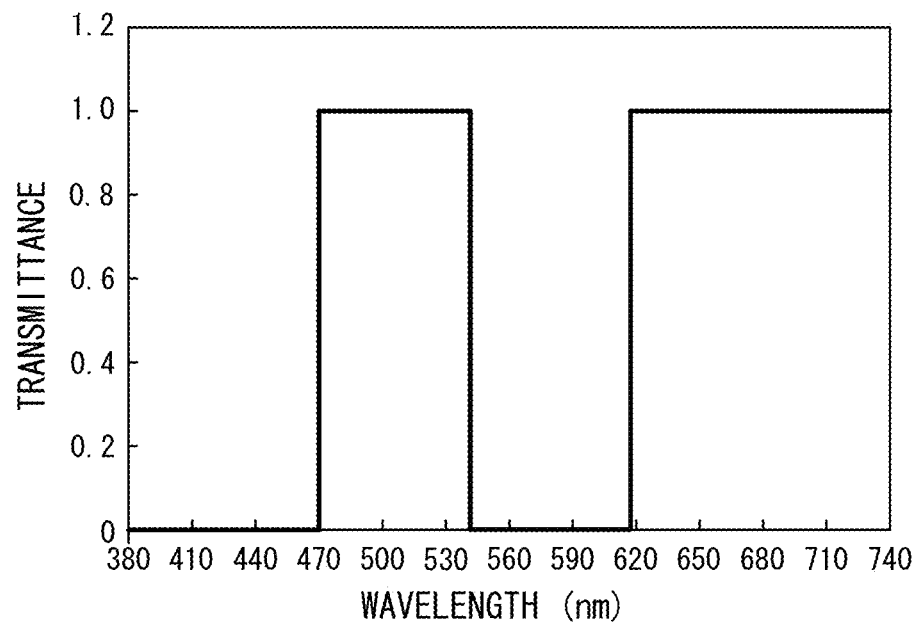
(b)
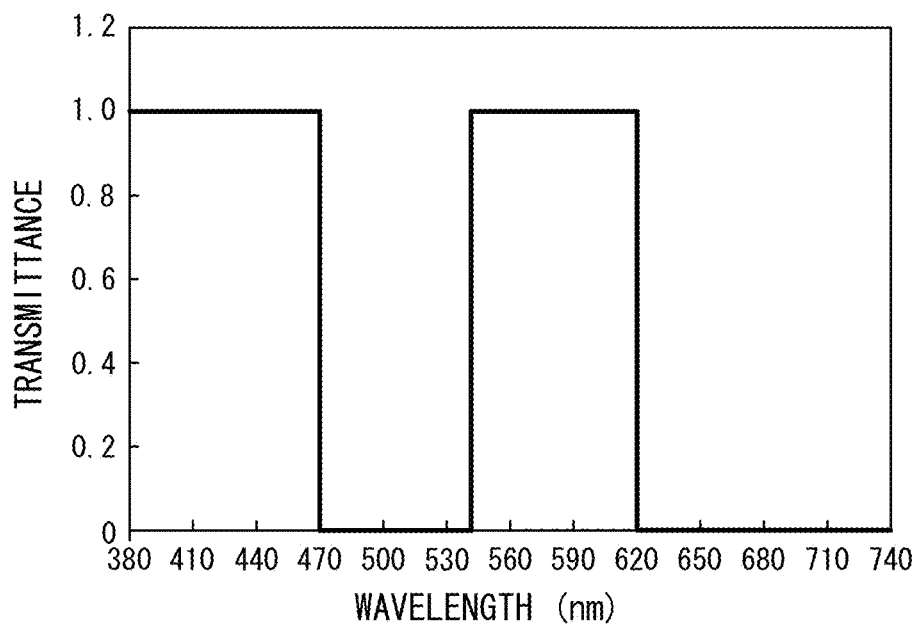

STAIN IMAGE COLOR CORRECTING APPARATUS, METHOD, AND SYSTEM

CROSS-REFERENCE TO RELATED APPLICATION

The present application is a Continuing Application based on International Application PCT/JP2011/077443 filed on Nov. 22, 2011, which, in turn, claims the priority from Japanese Patent Application No. 2010-265532 filed on Nov. 29, 2010, the entire disclosure of these earlier applications being herein incorporated by reference.

TECHNICAL FIELD

The present invention relates to an image processing apparatus, an image processing method, an image processing program, and a virtual microscope system.

BACK GROUND OF THE INVENTION

One of the physical quantities expressing a physical property specific to a subject of imaging is a spectral transmittance spectrum. Spectral transmittance is a physical quantity expressing a ratio of transmitted light to incident light at each wavelength, and bears specific information of an object with a value that does not change regardless of an extrinsic influence, unlike color information such as an RGB value that varies depending on changes in illumination light. Therefore, the spectral transmittance is used in various fields, as information for reproducing the color of a subject itself. For example, for a body tissue sample, particularly in the field of pathological diagnosis using pathological specimens, spectral transmittance has been used as an example of a spectral characteristic value for analysis of images acquired through imaging of specimens. Examples of application of the spectral transmittance in pathological diagnosis are described in further detail below.

In one of pathological examinations in pathological diagnosis, a sample of tissue are collected from part of a lesion and observed under a microscope, to thereby diagnose disease or to determine the degree of expansion of the lesion. This has been known as tissue diagnosis. In the tissue diagnosis, which is also referred to as biopsy, it is widely practiced to observe, by using a microscope, an enlarged view of a thin slice of several micron thickness of a block specimen obtained from a removed organ or a pathological specimen obtained from a needle aspiration biopsy, for the purpose of obtaining various findings. In particular, transmission observation using an optical microscope is one of the observation methods most widely practiced, because materials for optical microscopes are relatively inexpensive and easy to handle and this method has been traditionally used for many years. In the case of transmission observation, a sliced specimen hardly absorbs or scatters light and is substantially transparent and colorless, and hence it is a common practice to stain the specimen with a dye prior to observation.

Various methods have been proposed as the staining method, and there have been no less than a hundred methods in total. Particularly for pathological specimens, hematoxylin-eosin stain (hereinafter, referred to as "H&E stain") using bluish purple hematoxylin and red eosin has been generally used.

Hematoxylin is a natural substance extracted from plants, and has no stainability itself. However, hematin, which is an oxide of hematoxylin, is a basophilic dye and combines with a substance negatively charged. Because deoxyribonucleic acid (DNA) included in a cell nucleus is negatively charged due to a phosphate group included therein as a structural element, the DNA combines with hematin to be stained bluish purple. As described above, substance having stainability is not hematoxylin but its oxide, namely hematin. However, because it is common to use hematoxylin as the name of dye, this applies to the following explanations.

Meanwhile, eosin is an acidophilic dye, and combines with a substance positively charged. Amino acid and protein may be charged positively or negatively depending on its pH environment, and have a strong tendency to be charged positively under acidity. For this reason, acetic acid may be added to eosin. The protein included in a cytoplasm combines with eosin to be stained red or light red.

In a sample subjected to H&E stain (stained sample), cell nuclei, bone tissues or the like are stained bluish purple, while cytoplasm, connective tissues, red blood cells or the like are stained red, to have them become easily visible. Accordingly, an observer can ascertain the size, positional relation or the like of elements structuring cell nuclei or the like, thereby enabling morphological determination of the sample condition.

Observation of a stained sample is performed by multiband imaging the sample so as to display the sample image on a display screen of an external device, in addition to visual inspection by an observer. In a case of displaying a sample image on a display screen, the image is subjected to processing for estimating spectral transmittance at each point on the sample from the obtained multiband image, and processing for estimating, based on the estimated spectral transmittance, a dye amount with which the sample is stained, to thereby synthesize a display image as an RGB image for displaying the sample.

Examples of a method of estimating the spectral transmittance at each point on a sample from a multiband image of the sample include an estimation method by principal component analysis and an estimation method by the Wiener estimation. The Wiener estimation is widely known as a technique of linear filtering methods for estimating an original signal from an observed signal on which noise is superimposed, which is a method for minimizing an error, by taking into consideration statistical properties of an observed object and properties of imaging noise (observation noise). Because signals from a camera include some noise, the Wiener estimation is highly useful as a method of estimating an original signal.

A method of synthesizing a display image from a multiband image of a sample is explained below.

First, a sample is subjected to multiband imaging. For example, 16 pieces of bandpass filters are switched by rotating a filter wheel, to thereby obtain a multiband image a frame sequential method. In this way, multiband images having a pixel value of 16 bands at each point on the sample can be obtained. Although the dye is essentially distributed three-dimensionally in a sample to be observed, the dye cannot be directly imaged as a three-dimensional image by an ordinary transmission observation system, and is observed as a two-dimensional image in which illumination light that has passed the sample is projected onto an imaging element of the camera. Accordingly, each point mentioned herein signifies a point on the sample corresponding to each pixel projected onto the imaging element.

For an arbitrary point (pixel) x of the captured multiband image, there is established a relation expressed by Equation (1) below, which is based on a response system of the camera, between a pixel value g(x,b) in a band b and spectral transmittance t(x,λ) of a corresponding point on the sample.

$$g(x,b) = \int_\lambda f(b,\lambda)s(\lambda)e(\lambda)t(x,\lambda)d\lambda + n(b) \quad (1)$$

In Equation (1), λ denotes a wavelength, f(b,λ) denotes a spectral-transmittance of a b-th filter, s(λ) denotes a spectral sensitivity characteristic of the camera, e(λ) denotes a spectral emission characteristic of illumination, and n(b) denotes imaging noise in the band b. b denotes a serial number for identifying the band, and is an integer satisfying 1≤b≤16 herein. In actual calculation, Equation (2) below obtained by discretizing Equation (1) in a wavelength direction is used.

$$G(x) = FSET(x) + N \quad (2)$$

In Equation (2), when the number of samples in the wavelength direction is designated as D, and the number of bands is designated as B (here, B=16), G(x) corresponds to a B-by-1 matrix corresponding to a pixel value g(x,b) at a point x. Similarly, T(x) denotes a D-by-1 matrix corresponding to t(x,λ), and F denotes a B-by-D matrix corresponding to f(b, λ). On the other hand, S denotes a D-by-D diagonal matrix, and a diagonal element corresponds to s(λ). Similarly, E denotes a D-by-D diagonal matrix, and a diagonal element corresponds to e(λ). N denotes a B-by-1 matrix corresponding to n(b). In Equation (2), because Equations of a plurality of bands are put together using a matrix, a variable b expressing the band is not explicitly described. Further, an integral of the wavelength λ, is replaced by a product of matrices.

Here, to simplify the description, a matrix H defined by Equation (3) below is introduced into Equation (2). The matrix H is also referred to as a system matrix.

$$H = FSE \quad (3)$$

Thus, Equation (2) can be replaced by Equation (4) below.

$$G(x) = HT(x) + N \quad (4)$$

The spectral transmittance at each point on the sample is then estimated from the captured multiband image by using the Wiener estimation. An estimate value (spectral transmittance data) T^(x) of the spectral transmittance can be calculated by Equation (5) below. T^ means that T has a symbol "^ (hat)" affixed thereon, the symbol "^" representing an estimate value.

$$\hat{T}(x) = WG(x) \quad (5)$$

Here, W is expressed by Equation (6) below, and is referred to as "Wiener estimation matrix" or "estimation operator used in the Wiener estimation".

$$W = R_{SS}H^t(HR_{SS}H^t + R_{NN})^{-1} \quad (6)$$

where ( )$^t$: transposed matrix, ( )$^{-1}$: inverse matrix.

In Equation (6), $R_{SS}$ is a of D-by-D matrix and represents an autocorrelation matrix of the spectral transmittance of the sample. $R_{NN}$ is a B-by-B matrix and represents an autocorrelation matrix of noise of the camera used for imaging.

After thus estimating spectral transmittance data T^(x), amounts of dyes at a corresponding point on the sample (sample point) are estimated based on the T^(x). The dyes to be estimated are three kinds of dyes, which are hematoxylin, eosin that stains a cell cytoplasm, and eosin that stains red blood cells or an original dye of the red blood cells that are not stained. These three kinds of dyes are abbreviated as dye H, dye E, and dye R, respectively. To be strict, the red blood cells have an intrinsic color itself even in an unstained state, and after the H&E stain is performed, the color of the red blood cells and the color of eosin that has changed in a staining process are superposed on each other at the time of observation. Therefore, to be precise, color obtained by combining both of the colors is referred to as dye R.

Generally, in a substance that transmits light, it is known that the Lambert-Beer law represented by Equation (7) below is established between an intensity $I_0(\lambda)$ of incident light and an intensity $I(\lambda)$ of emitted light at each wavelength λ.

$$\frac{I(\lambda)}{I_0(\lambda)} = e^{-k(\lambda) \cdot d} \quad (7)$$

In Equation (7), k(λ) denotes a value specific to a substance determined depending on the wavelength, and d denotes a thickness of the substance.

The left side of Equation (7) indicates a spectral transmittance t(λ), and hence Equation (7) can be replaced by Equation (8) below.

$$t(\lambda) = e^{-k(\lambda) \cdot d} \quad (8)$$

Further, a spectral absorbance a(λ) is represented by Equation (9) below.

$$a(\lambda) = k(\lambda) \cdot d \quad (9)$$

Thus, Equation (8) can be replaced by Equation (10) below.

$$t(\lambda) = e^{-a(\lambda)} \quad (10)$$

When an H&E stained sample is stained with three kinds of dyes including the dye H, the dye E, and the dye R, Equation (11) below is established at each wavelength λ by the Lambert-Beer law.

$$\frac{I(\lambda)}{I_0(\lambda)} = e^{-(k_H(\lambda) \cdot d_H + k_E(\lambda) \cdot d_E + k_R(\lambda) \cdot d_R)} \quad (11)$$

In Equation (11), $k_H(\lambda)$, $k_E(\lambda)$, and $k_R(\lambda)$ denote k(λ) corresponding to the dye H, the dye E, and the dye R, respectively, and for example, are dye spectra (hereinafter, referred to as "reference dye spectra") of respective dyes that stain the sample. Further, $d_H$, $d_E$, and $d_R$ each indicate a virtual thickness of the dye H, the dye E, and the dye R, respectively, at each point on the sample corresponding to each image position of the multiband image. Basically, dyes are dispersed in a sample, and thus the concept of thickness may not be accurate. However, the virtual thickness may serve as an index of a relative dye amount indicating how much amount of dye is present as compared to a case where the sample is assumed to be stained with a single dye. That is, it can be said that $d_H$, $d_E$, and $d_R$ indicate a dye amount of the dye H, the dye E, and the dye R, respectively. The values $k_H(\lambda)$, $k_E(\lambda)$, and $k_R(\lambda)$ can be easily acquired from the Lambert-Beer law, by preparing beforehand samples that are stained individually by using the dye H, the dye E, and the dye R, and measuring a spectral transmittance thereof with a spectrometer.

When it is assumed that a spectral transmittance at a position x is t(x,λ) and a spectral absorbance at the position x is a(x,λ), Equation (9) can be replaced by Equation (12) below.

$$a(x,\lambda) = k_H(\lambda) \cdot d_H + k_E(\lambda) \cdot d_E + k_R(\lambda) \cdot d_R \quad (12)$$

When it is assumed that an estimated spectral transmittance at the wavelength λ, of the spectral transmittance T^(x) estimated by using Equation (5) is t^(x,λ), and an estimated absorbance is a^(x,λ), Equation (12) can be replaced by Equation (13) below. Here, t^ means that t has a symbol "^" affixed thereon, and a^ means that a has a symbol "^" affixed thereon.

$$\hat{a}(x,\lambda) = k_H(\lambda) \cdot d_H + k_E(\lambda) \cdot d_E + k_R(\lambda) \cdot d_R \quad (13)$$

In Equation (13), unknown variables are three variables of $d_H$, $d_E$, and $d_R$. Therefore, Equation (13) can be solved simultaneously for at least three different wavelengths λ, to obtain these values. To further improve the accuracy, Equation (13) can be solved simultaneously for four or more different wavelengths λ, so as to perform multiple regression analysis. For example, when Equation (13) is solved simultaneously for three wavelengths $\lambda_1$, $\lambda_2$, and $\lambda_3$, Equation (13) can be expressed in a matrix as Equation (14) below.

$$\begin{pmatrix} \hat{a}(x,\lambda_1) \\ \hat{a}(x,\lambda_2) \\ \hat{a}(x,\lambda_3) \end{pmatrix} = \begin{pmatrix} k_H(\lambda_1) & k_E(\lambda_1) & k_R(\lambda_1) \\ k_H(\lambda_2) & k_E(\lambda_2) & k_R(\lambda_2) \\ k_H(\lambda_3) & k_E(\lambda_3) & k_R(\lambda_3) \end{pmatrix} \begin{pmatrix} d_H \\ d_E \\ d_R \end{pmatrix} \quad (14)$$

Equation (14) is replaced here by Equation (15) below.

$$\hat{A}(x) = Kd(x) \quad (15)$$

In Equation (15), when the number of samples in a wavelength direction is D, $\hat{A}(x)$ is a D-by-1 matrix corresponding to $\hat{a}(x,\lambda)$, K is a D-by-3 matrix of corresponding to $k(\lambda)$, and d(x) is a 3-by-1 matrix corresponding to $d_H$, $d_E$, and $d_R$ at a point x. Here, $\hat{A}$ means that A has a symbol "^" affixed thereon.

According to Equation (15), the dye amounts $d_H$, $d_E$, and $d_R$ are calculated using a least square method. The least square method is a method of determining d(x) such that a square sum of an error is minimized in a single regression Equation, and the dye amounts can be calculated by Equation (16) below. In Equation (16), $\hat{d}(x)$ is an estimated dye amount.

$$\hat{d}(x) = (K^T K)^{-1} K^T \hat{A}(x) \quad (16)$$

Further, when the estimated dye amounts $\hat{d}_H$, $\hat{d}_E$, $\hat{d}_R$ obtained by Equation (16) are substituted in Equation (12), a restored spectral absorbance a(x,y) can be obtained according to Equation (17) below.

$$\tilde{a}(x,\lambda) = k_H(\lambda) \cdot \hat{d}_H + k_E(\lambda) \cdot \hat{d}_E + k_R(\lambda) \cdot \hat{d}_R \quad (17)$$

An estimated error e(λ) in dye amount estimation is obtained based on the estimated spectral absorbance $\hat{a}(x,\lambda)$ and the restored spectral absorbance a(x,y) according to Equation (18) below. Hereinafter, e(λ) is referred to as "residual spectrum".

$$e(\lambda) = \hat{a}(x,\lambda) - \tilde{a}(x,\lambda) \quad (18)$$

The estimated spectral absorbance $\hat{a}(x,\lambda)$ can be represented by Equation (19) below based on Equations (17) and (18).

$$\hat{a}(x,\lambda) = k_H(\lambda) \cdot \hat{d}_H + k_E(\lambda) \cdot \hat{d}_E + k_R(\lambda) \cdot \hat{d}_R + e(\lambda) \quad (19)$$

The Lambert-Beer law formulates attenuation of light transmitting through a semi-transparent substance while assuming that there is no refraction or scattering. However, in an actual sample, refraction and scattering can both occur. Therefore, when attenuation of light due to the sample is modeled only by the Lambert-Beer law, errors may occur along with the modeling.

However, it is quite difficult to construct a model including refraction or scattering in biological specimens, which is impracticable in actual application. Therefore, the residual spectrum e(λ), which is a modeling error including influences of refraction and scattering, is taken into consideration, so that unnatural color variation by a physical model can be prevented from being caused.

Further, once the dye amounts $\hat{d}_H$, $\hat{d}_E$, $\hat{d}_R$ are obtained, the dye amounts may be corrected as appropriate so as to simulate changes in dye amount in the specimen. In this case, only the amounts of dyes $\hat{d}_H$, $\hat{d}_E$ which are stained by a staining method are subjected to correction, without subjecting $\hat{d}_E$ to correction as $\hat{d}_R$ being an original color of red blood cells. The corrected dye amounts $\hat{d}_H^*$, $\hat{d}_E^*$ in this case can be obtained by Equation (20) below using appropriate coefficients $\alpha_H$, $\alpha_E$.

$$\hat{d}_H^* = \alpha_H \hat{d}_H$$

$$\hat{d}_E^* = \alpha_E \hat{d}_E \quad (20)$$

The corrected dye amounts $\hat{d}_H^*$, $\hat{d}_E^*$ in Equation (20) is substituted in Equation (12), a new spectral absorbance a*(x, λ) can be obtained from Equation (21) below.

$$\tilde{a}^*(x,\lambda) = k_H(\lambda) \cdot \hat{d}_H^* + k_E(\lambda) \cdot \hat{d}_E^* + k_R(\lambda) \cdot \hat{d}_R \quad (21)$$

Further, in the case of including residual spectrum, a new spectral absorbance $\hat{a}^*(x,\lambda)$ can be obtained from Equation (22) below.

$$\hat{a}^*(x,\lambda) = k_H(\lambda) \cdot \hat{d}_H^* + k_E(\lambda) \cdot \hat{d}_E^* + k_R(\lambda) \cdot \hat{d}_R + e(\lambda) \quad (22)$$

When the spectral absorbance a*(x,λ) of Equation (21) or the $\hat{a}^*(x,\lambda)$ of Equation (22) is substituted in Equation (10), a new spectral transmittance t*(x,λ) can be obtained from Equation (23) below.

$$t^*(x,\lambda) = e^{-a*(x,\lambda)} \quad (23)$$

The spectral absorbance a*(x,λ) is either a*(x,λ) of Equation (21) or $\hat{a}^*(x,\lambda)$ of Equation (22).

When Equation (23) is substituted in Equation (1), a new pixel value g*(x,b) can be obtained from Equation (24) below. Here, in Equation (24) below, an observation noise n(b) is deemed as zero.

$$g^*(x,b) = \int_\lambda f(b,\lambda) s(\lambda) e(\lambda) t^*(x,\lambda) d\lambda \quad (24)$$

Here, Equation (4) is replaced by Equation (25) below.

$$G^*(x) = HT^*(x) \quad (25)$$

In Equation (25), G*(x) is a B-by-1 matrix corresponding to g*(x,b), and T*(x) is a D-by-1 matrix corresponding to t*(x). This way makes it possible to synthesize a pixel value G*(x) of a specimen which is virtually varied in dye amount. Through the aforementioned procedure, the dye amount of a stained specimen can be virtually adjusted.

As a method of correcting a dye amount, there has been known a method of correcting the stained state of a stained sample image to a normal state. For example, Patent Literature 1 (PTL 1) discloses an image processor in which pixels of a stained sample image are classified into a plurality of classes based on the dye amount, and the dye amount of each class is corrected to a dye amount in a normally stained state, to thereby correct the stained state of the stained sample image to a normal state.

CITATION LIST

Patent Literature

PTL 1: JP 2009-14355 A

SUMMARY OF THE INVENTION

According to a first aspect of the present invention, there is provided an image processing apparatus for processing a stained sample image obtained by imaging a stained sample, which includes:

a characteristic amount calculator for calculating a first characteristic amount for each pixel constituting the stained sample image;

a component ratio calculator for calculating a component ratio of components in a target pixel, based on the first characteristic amount calculated by the characteristic amount calculator;

a reference value storage portion for storing a reference value of a second characteristic amount for each of the components;

a component correction coefficient calculator for calculating a component correction coefficient representing a correction coefficient for the second characteristic amount of each of the components, based on the second characteristic amount of each of the components and the reference value thereof stored in the reference value storage portion;

a target pixel correction coefficient calculator for calculating a target pixel correction coefficient representing a correction coefficient for the second characteristic amount of the target pixel, based on the component ratio calculated by the component ratio calculator and the component correction coefficient calculated by the component correction coefficient calculator; and a characteristic amount corrector for correcting the second characteristic amount of the target pixel, based on the target pixel correction coefficient calculated by the target pixel correction coefficient calculator.

According to a second aspect of the present invention, in the image processing apparatus according to the first aspect, the component ratio calculator calculates the component ratio of the components, based on the Euclidean distance between a target pixel and each of the components, in a predetermined characteristic amount space of the first characteristic amount in the stained sample image.

According to a third aspect of the present invention, in the image processing apparatus according to the first aspect, the component ratio calculator calculates the component ratio of the components, based on the Mahalanobis distance between a target pixel and each of the components, in a predetermined characteristic amount space of the first characteristic amount in the stained sample image.

According to a fourth aspect of the present invention, the image processing apparatus according to the first aspect further includes a dye amount estimator for estimating a dye amount in each pixel constituting the stained sample image, in which:

the reference value storage portion stores a dye amount reference value for each of the components;

the component correction coefficient calculator calculates, as the component correction coefficient, a correction coefficient for the dye amount of each of the components, based on the dye amount estimated by the dye amount estimator and the dye amount reference value stored in the reference value storage portion;

the target pixel correction coefficient calculator calculates, as the target pixel correction coefficient, a correction coefficient for the dye amount of the target pixel, based on the component ratio calculated by the component ratio calculator and the component correction coefficient calculated by the component correction coefficient calculator; and the characteristic amount corrector corrects the dye amount of the target pixel, based on the target pixel correction coefficient calculated by the target pixel correction coefficient calculator.

According to a fifth aspect of the present invention, in the image processing apparatus according to the fourth aspect, the reference value storage portion stores the dye amount of each of the components in an image of a normally stained sample, as the dye amount reference value.

According to a sixth aspect of the present invention, the image processing apparatus according to the fourth aspect further includes a display image generator for generating a display image, based on the dye amount corrected by the characteristic amount corrector.

According to a seventh aspect of the present invention, the image processing apparatus according to the fourth aspect further includes an optical spectrum estimator for estimating an optical spectrum based on a pixel value of the stained sample image, in which:

the dye amount estimator estimates a dye amount in each pixel constituting the stained sample image, based on the optical spectrum estimated by the optical spectrum estimator.

According to an eighth aspect of the present invention, in the image processing apparatus according to first aspect, the second characteristic amount is a pixel value, the reference value storage portion stores a reference pixel value of each of the components, the component correction coefficient calculator calculates, as the component correction coefficient, a correction coefficient for a pixel value of each of the components, based on the pixel value of each of the components and the reference pixel value stored in the reference value storage portion, the target pixel correction coefficient calculator calculates, as the target pixel correction coefficient, a correction coefficient for the pixel value of the target pixel, based on the component ratio calculated by the component ratio calculator and the component correction coefficient calculated by the component correction coefficient calculator, and the characteristic amount corrector corrects the pixel value of the target pixel, based on the target pixel correction coefficient calculated by the target pixel correction coefficient calculator.

According to a ninth aspect of the present invention, there is provided an image processing method of processing a stained sample image obtained by imaging a stained sample, the method including the steps of:

calculating a first characteristic amount for each pixel constituting the stained sample image;

calculating a component ratio of components in a target pixel, based on the first characteristic amount thus calculated;

calculating a component correction coefficient representing a correction coefficient for a second characteristic amount of each of the components, based on the second characteristic amount of each of the components and a reference value of the second characteristic amount;

calculating, based on the component ratio and the component correction coefficient thus calculated, a target pixel correction coefficient representing a correction coefficient for the second characteristic amount of the target pixel; and correcting the second characteristic amount of the target pixel, based on the target pixel correction coefficient thus calculated.

According to a tenth aspect of the present invention, there is provided an image processing program for processing a stained sample image obtained by imaging a stained sample, the program causing a computer to execute the processes of:

calculating a first characteristic amount for each pixel constituting the stained sample image;

calculating, based on the first characteristic amount thus calculated, a component ratio of components in a target pixel;

calculating a component correction coefficient representing a correction coefficient for a second characteristic amount of each of the components, based on the second characteristic amount of each of the components and a reference value of the second characteristic amount;

calculating a target pixel correction coefficient representing a correction coefficient for the second characteristic amount of the target pixel, based on the component ratio and the component correction coefficient thus calculated; and correcting the second characteristic amount of the target pixel, based on the target pixel correction coefficient thus calculated.

According to an eleventh aspect of the present invention, there is provided a virtual microscope system for acquiring a virtual slide image of a stained sample, the virtual microscope system including:

an image acquiring portion for acquiring a stained sample image by imaging the stained sample using a microscope;

a characteristic amount calculator for calculating a first characteristic amount for each pixel constituting the stained sample image acquired by the image acquiring portion;

a component ratio calculator for calculating a component ratio of components in a target pixel, based on the first characteristic amount calculated by the characteristic amount calculator;

a reference value storage portion for storing a reference value of a second characteristic amount for the each of the components;

a component correction coefficient calculator for calculating a component correction coefficient representing a correction coefficient for the second characteristic amount of each of the components, based on the second characteristic amount of each of the components and the reference value thereof stored in the reference value storage portion;

a target pixel correction coefficient calculator for calculating a target pixel correction coefficient representing a correction coefficient for the second characteristic amount of the target pixel, based on the component ratio calculated by the component ratio calculator and the component correction coefficient calculated by the component correction coefficient calculator; and a characteristic amount corrector for correcting the second characteristic amount of the target pixel, based on the target pixel correction coefficient calculated by the target pixel correction coefficient calculator, in which the virtual microscope system is configured to acquire a virtual slide image of the stained sample, based on the image data in which the second characteristic amount is corrected by the characteristic amount corrector.

BRIEF DESCRIPTION OF DRAWINGS

The patent or application file contains at least one drawing executed in color. Copies of this paper or patent application publication with color drawing(s) will be provided by the Office upon request and payment of the necessary fee.

The present invention will be further described below with reference to the accompanying drawings, wherein:

FIGS. 4(a) and 4(b) each are a graph showing the spectral transmittance characteristic of each optical filter constituting the filter portion of FIG. 2;

DESCRIPTION OF EMBODIMENTS

Figure 1:
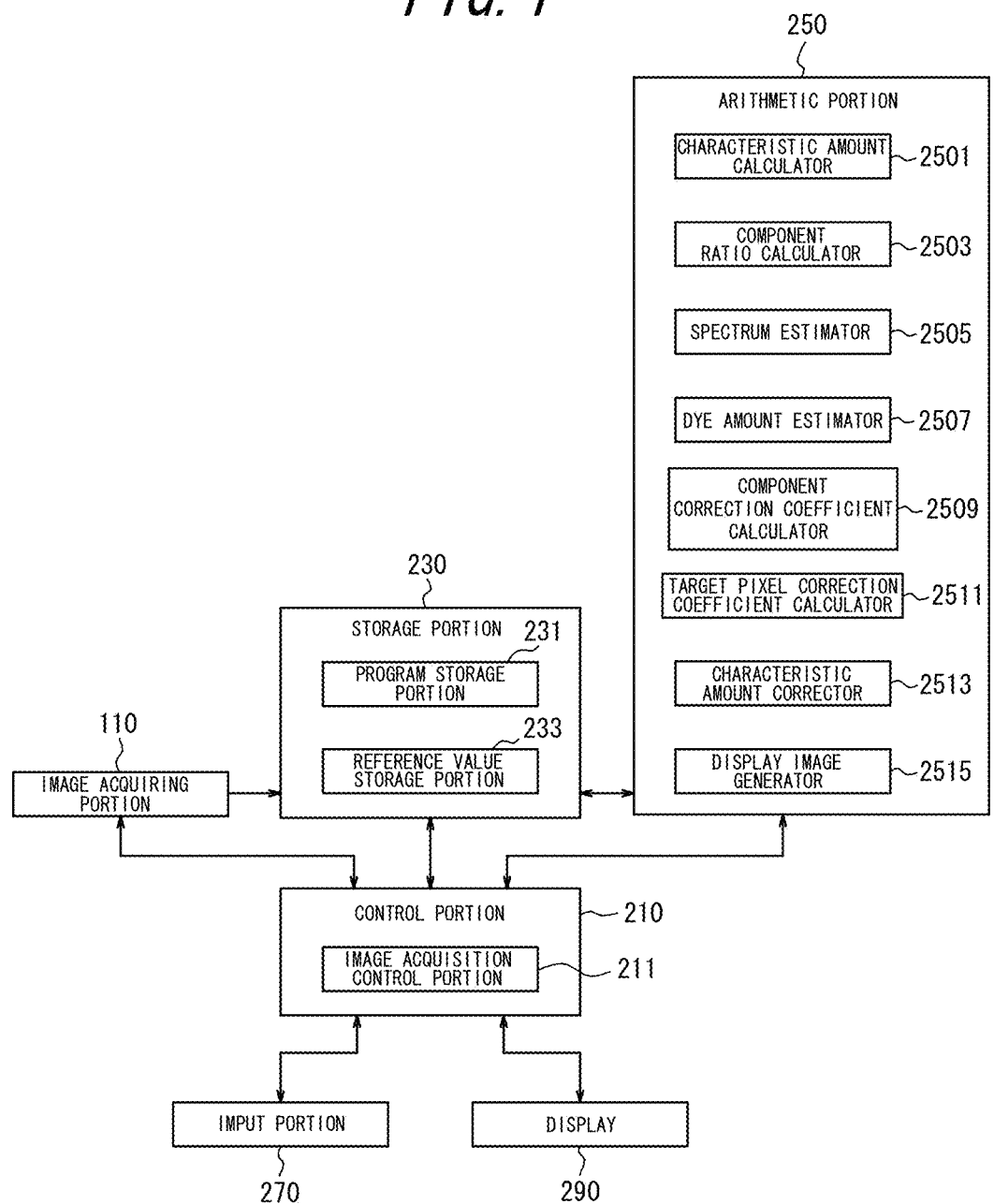
FIG. 1 is a block diagram illustrating functional configurations of main components of an image processing apparatus according to a first embodiment of the present invention.

In the following, preferred embodiments of the present invention are described in detail with reference to the drawings. However, the present invention is not limited to the embodiments described below. Further, in the drawings, like parts are denoted by like reference numerals or symbols.

First Embodiment

FIG. 1 is a block diagram illustrating functional configurations of main components of an image processing apparatus according to a first embodiment of the present invention. The image processing apparatus includes a microscope and a computer such as a personal computer, and includes an image acquiring portion 110, an input portion 270, a display 290, an arithmetic portion 250, a storage portion 230, and a control portion 210 that controls respective portions.

Figure 2:
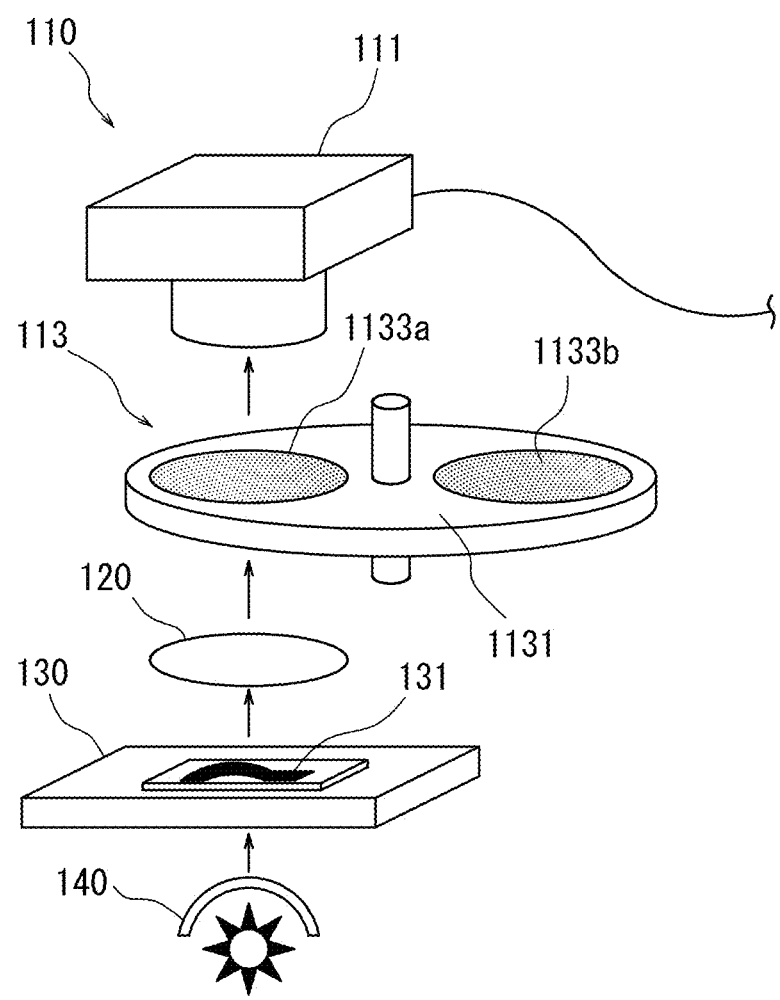
FIG. 2 illustrates a schematic configuration of the image acquiring portion of FIG. 1.

The image acquiring portion 110 is for acquiring a multi-band image (6-band image in this case), and includes an RGB camera 111 and a filter portion 113, as illustrated, for example, in FIG. 2. The filter portion 113 is for limiting, to a predetermined range, the wavelength band of light forming an image in the RGB camera 111.

Figure 3:
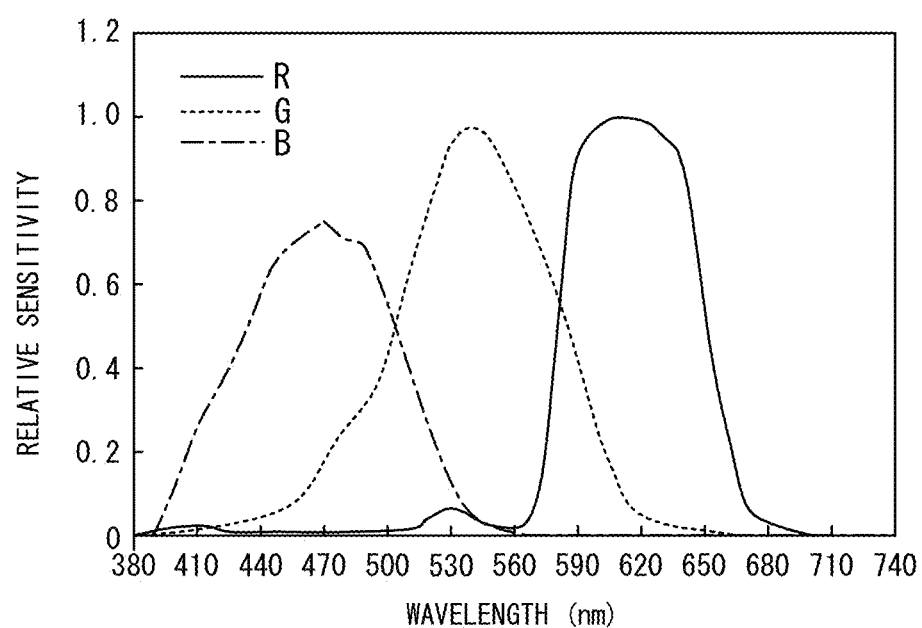
FIG. 3 is a graph showing the spectral sensitivity characteristics of the RGB camera of FIG. 2.

The RGB camera 111 includes an image sensor such as a charge coupled device (CCD) or a complementary metal oxide semiconductor (CMOS), and has a spectral sensitivity characteristic for each band of R (red), G (green), and B (blue) as illustrated, for example, in FIG. 3. The filter portion 113 is for limiting, to a predetermined range, the wavelength band of light forming an image in the RGB camera 111, and includes a rotary filter switching portion 1131. The filter switching portion 1131 holds two optical filters 1133a, 1133b having spectral transmittance characteristics different from each other so as to divide in two the transmission wavelength range of each band of R, G, B. FIG. 4(a) shows the spectral transmittance characteristic of the optical filter 1133a on the one hand, while FIG. 4(b) shows the spectral transmittance characteristic of the optical filter 1133b on the other hand.

Then, the control portion 210 causes, for example, the optical filter 1133a to be disposed on an optical path leading to the RGB camera 111 from an illuminating portion 140, so as to illuminate, by the illuminating portion 140, a target sample 131 placed on a light receiving position moving portion 130, and transmitted light from the sample passes through the imaging lens 120 and the optical filter 1133a so as to be imaged in the RGB camera 111, to thereby perform first imaging. Next, the control portion 210 causes the filter switching portion 1131 to rotate, so that the optical filter 1133b is disposed on the optical path leading to the RGB camera 111 from the illuminating portion 140, to thereby similarly perform second imaging.

As a result, 3-band images different from each other are obtained through the first imaging and the second imaging, so as to acquire a multiband image having 6 bands in total. The image of the target sample 131 thus acquired is stored in the storage portion 230. The number of optical filters to be provided to the filter portion 113 is not limited to two, and three or more optical filters may be used to acquire a multiband image which includes more bands. Alternatively, the image acquiring portion 110 may be configured without including the filter portion 113, so as to acquire only an RGB image by the RGB camera 111.

The input portion 270 is implemented by, for example, an input device such as a keyboard, a mouse, a touch panel, and various switches, and outputs, to the control portion 210, an input signal corresponding to an operational input.

The display 290 is implemented by a display device such as a liquid crystal display (LCD), an electro luminescence (EL) display, or a cathode ray tube (CRT) display, and displays various screens based on display signals input from the control portion 210.

The arithmetic portion 250 has a characteristic amount calculator 2501, a component ratio calculator 2503, a spectrum estimator 2505, a dye amount estimator 2507, a component correction coefficient calculator 2509, a target pixel correction coefficient calculator 2511, a characteristic amount corrector 2513, and a display image generator 2515. The arithmetic portion 250 is implemented by hardware such as a CPU.

The storage portion 230 includes: a program storage portion 231 for storing an image processing program for operating the image processing apparatus; and a reference value storage portion 233 for storing a reference value of a second characteristic amount of each component in a stained sample image. The storage portion 230 stores, for example, data to be used during execution of the image processing program. The storage portion 230 is implemented by various IC memories such as a ROM and a RAM formed of a rewritable flash memory, a hard disk incorporated therein or connected by a data communication terminal, a combination of an information storage medium such as a CD-ROM and a reader thereof and the like.

The control portion 210 includes an image acquisition control portion 211 for controlling the operation of the image acquiring portion 110 so as to acquire an image of a target sample 131. The control portion 210 provides instructions and transfers data to the respective components constituting the image processing apparatus, based on an input signal input from the input portion 270, an image input from the image acquiring portion 110, and programs and data stored in the storage portion 230, to thereby perform overall control of the entire operation. The control portion 210 is implemented by hardware such as CPU.

Figure 5:
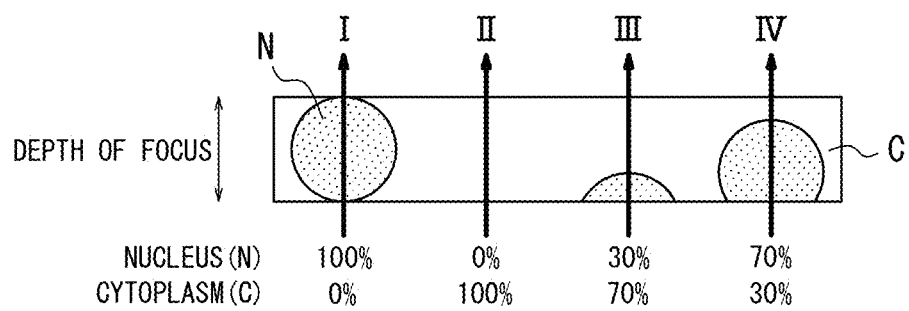
FIG. 5 illustrates various states of a target sample within a depth of focus.

In the image processing apparatus according to this embodiment, as illustrated in FIG. 2, the target sample 131 is illuminated by the illuminating portion 140, and transmitted light from the sample is imaged by the imaging lens 120 onto the RGB camera 111. In this case, the pixels of the RGB camera 111 receive light beams that are different from one another, depending on the state of the target sample 131 in the depth of focus of the imaging lens 120. For example, as illustrated in FIG. 5, the light beams include: (I) a light beam having passed through only a cell nucleus N; (II) a light beam having passed through only a cytoplasm C; and (III, IV) light beams each having passed through both the cell nucleus N and the cytoplasm C. Here, the light beam (III) has passed through the cell nucleus N accounting for approximately 30% and the cytoplasm C accounting for approximately 70%, and the light beam (IV) has passed through the cell nucleus N accounting for approximately 70% and the cytoplasm C accounting for 30%.

As described above, the pixels of RGB camera 111 not only receive a light beam that has passed through one tissue, but also receives a light beam that has passed through a plurality of tissues. Indeed, examples of such tissues include, in addition to the cell nucleus N and the cytoplasm C, red blood cells, cavities, and the like, and therefore the illuminating light passes through some of the tissues before being imaged onto the pixels of the RGB camera 111.

According to the image processing apparatus of this embodiment, when a plurality of tissues are present within the depth of focus, image data is corrected depending on the component ratio of components in the tissues. In the following, each process to be performed by the image processing apparatus of this embodiment is described. Here, the control portion 210 controls an operation of each component in accordance with an image processing program stored in the storage portion 230, to thereby execute each process to be described in below.

Figure 6:
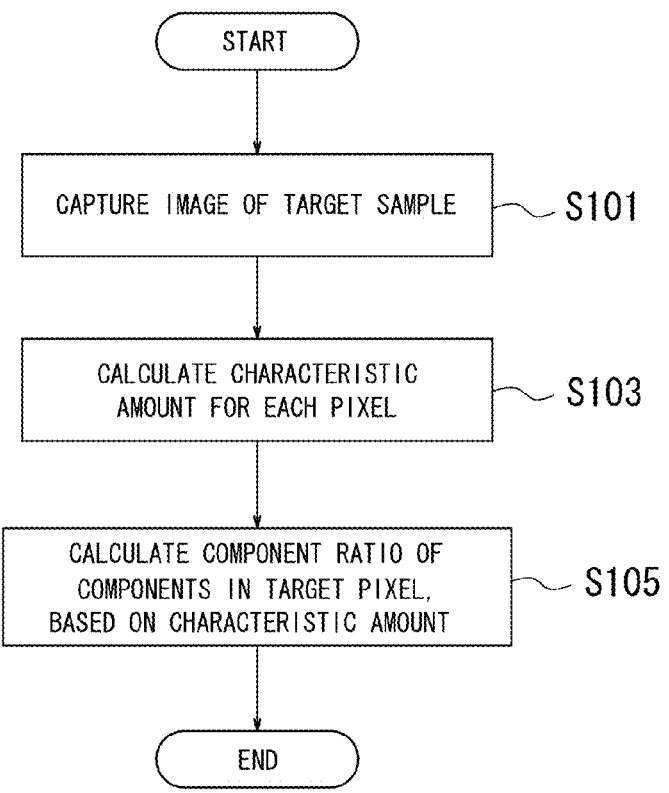
FIG. 6 is a flowchart illustrating a process of calculating a component ratio of components within the depth of focus.

FIG. 6 is a flowchart illustrating a process of calculating a component ratio of components within the depth of focus, the components having transmitted the light received by a target pixel of the RGB camera 111. First, the control portion 210 controls, by means of the image acquisition control portion 211, the operation of the image acquiring portion 110, to thereby acquire an image of the target sample 131 (Step S101). The target sample image thus acquired is stored in the storage portion 230.

Figure 7:
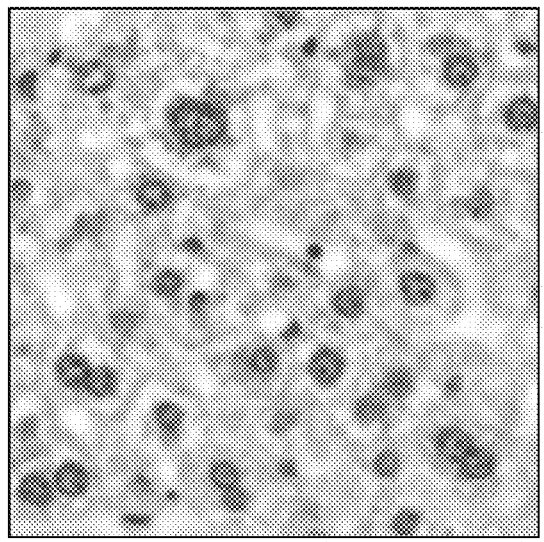
FIG. 7 is a photomicrograph of an example of a single-color H stained sample.
Figure 8:
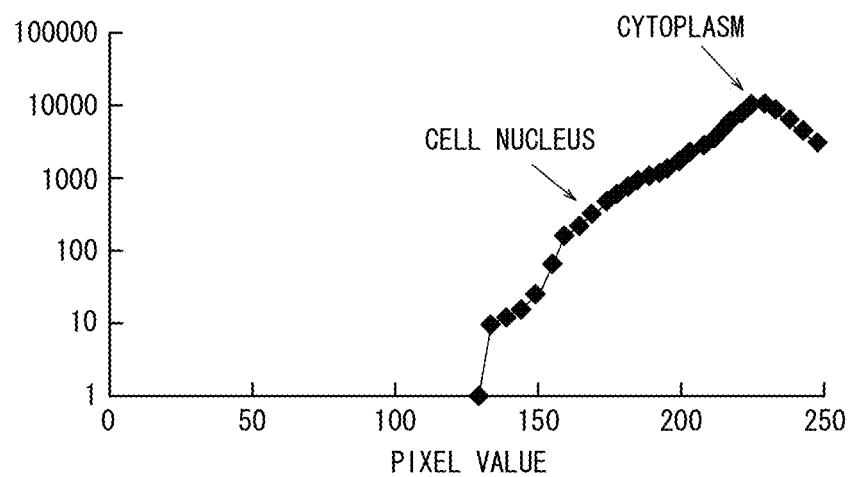
FIG. 8 is a histogram showing a relation between the pixel value in the R band and the logarithm of the pixel count in the Single-color H stained sample image of FIG. 7.

Next, the characteristic amount calculator 2501 calculates a first characteristic amount for each pixel constituting the acquired target sample image (Step S103). Then, calculated is an average value $u_i$ of the calculated first characteristic amounts for components in a predetermined (arbitrarily defined) characteristic amount space. For example, when calculating a pixel value of a reverse (R) band as the first characteristic amount, there is obtained, based on a Single-color H stained sample image as shown in FIG. 7, a histogram showing a relation between the pixel value in the R band and the logarithm of the pixel count as shown in FIG. 8. Then, based on the histogram of FIG. 8, the pixel values are grouped into those of the cell nuclei and into those of the cytoplasm by, for example, a class grouping process such as K-means clustering, and an average value of the pixel values in the R band is calculated for each group.

Here, the K-means method is a simple technique of nonhierarchical clustering, and also referred to as K-means. The K-means method is generally implemented according to the following procedure, so that data is classified into given K number of clusters using cluster means.

(1) The number of data items is set to n, and the number of clusters is set to K.
(2) The clusters are randomly assigned to data items.
(3) The center of each cluster is calculated based on the data items assigned with the cluster. In general, the mean of each element in the data items assigned with the cluster is used in the calculation.

(4) The distance between each data item and the center of each cluster is obtained, and the data items are each reassigned with a cluster having a center closest to the data item.

(5) When there is no change in the cluster assignment in all the data items in the above-mentioned process, the process is terminated. Until then, the center of each cluster is recalculated based on the reassigned clusters, and the above-mentioned process is repeated.

The classification results obtained by the K-means method largely depend on the random assignment of clusters at the start. Accordingly, the range between the minimum value and the maximum value of the data may be equally divided and assigned with clusters. In this manner, the results may be constantly converged on equal values.

Figure 9:
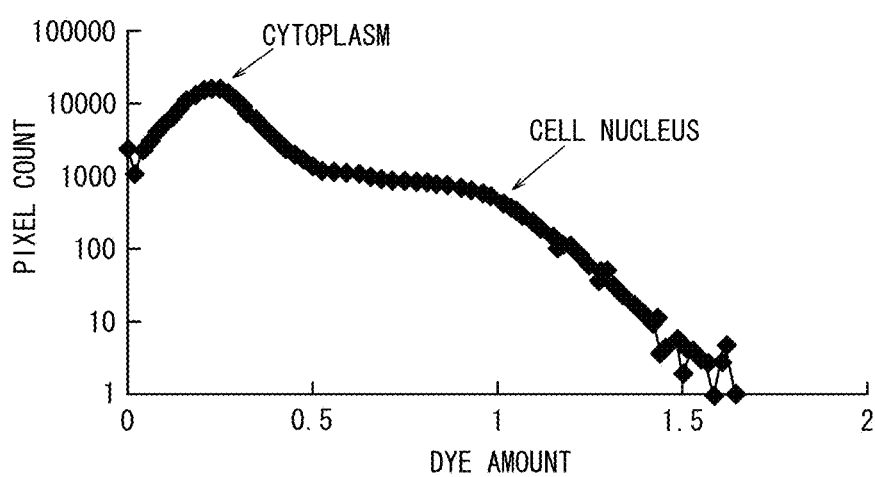
FIG. 9 is a histogram showing a relation between the H dye amount and the logarithm of the pixel count in the Single-color H stained sample image of FIG. 7.

Here, the first characteristic amount is not limited to the pixel value in the R band, and may use the H dye amount. FIG. 9 is a histogram showing a relation between the H dye amount and the logarithm of the pixel count in the Single-color H stained sample image. How to calculate the dye amount in this case is described later.

Figure 10:
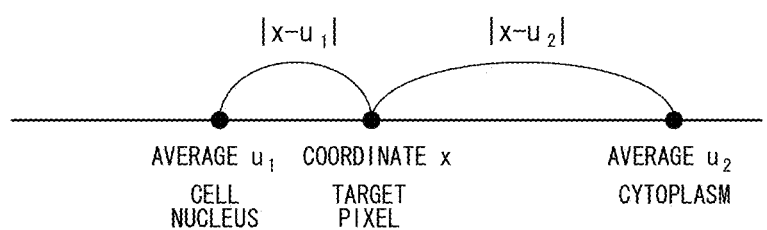
FIG. 10 is a schematic view for illustrating the Euclidean distance to be used for calculating the component ratio of components in a target pixel.

Next, the component ratio calculator 2503 calculates, based on the first characteristic amount, a component ratio of components in a target pixel (Step S105). In this case, as the component ratio, a distance dist(x,i) between a target pixel x and each component i is calculated for each pixel. The distance is calculated, for example, based on the Euclidean distance expressed by, for example, Equation (26) below. FIG. 10 is a schematic view for illustrating the Euclidean distance.

$$dist(x,i) = |x - u_i| \qquad (26)$$

Figure 11:
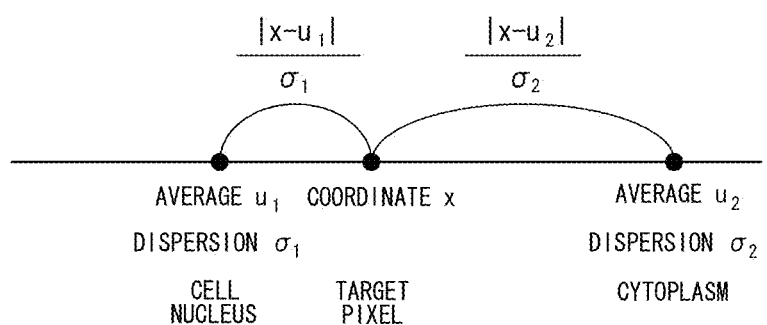
FIG. 11 is a schematic view for illustrating the Mahalanobis distance to be used for calculating the component ratio of components in a target pixel.

Here, the aforementioned distance dist(x,i) is not limited to the Euclidean distance, and may use the Mahalanobis distance. In this case, other than the average value $u_i$, a dispersion $\sigma_i$ is calculated by the known OTSU method. Then, using Equation (27) below, the Mahalanobis distance is calculated. FIG. 11 is a schematic view for illustrating the Mahalanobis distance.

$$dist(x, i) = \frac{|x - u_i|}{\sigma_i} \qquad (27)$$

Next, using Equation (28) below, the component ratio rate (x,i) is calculated based on the distance dist(x,i).

$$rate(x, i) = \frac{dist(x, i)}{\sum_j dist(x, j)} \qquad (28)$$

In this manner, a component ratio of components within the depth of focus, the components having transmitted the light received by each pixel. The calculated component ratio rate (x,i) of components in each pixel is stored in the storage portion 230. In the image processing apparatus of this embodiment, the component ratio rate(x,i) of components is used to correct a dye amount as a second characteristic amount.

Figure 12:
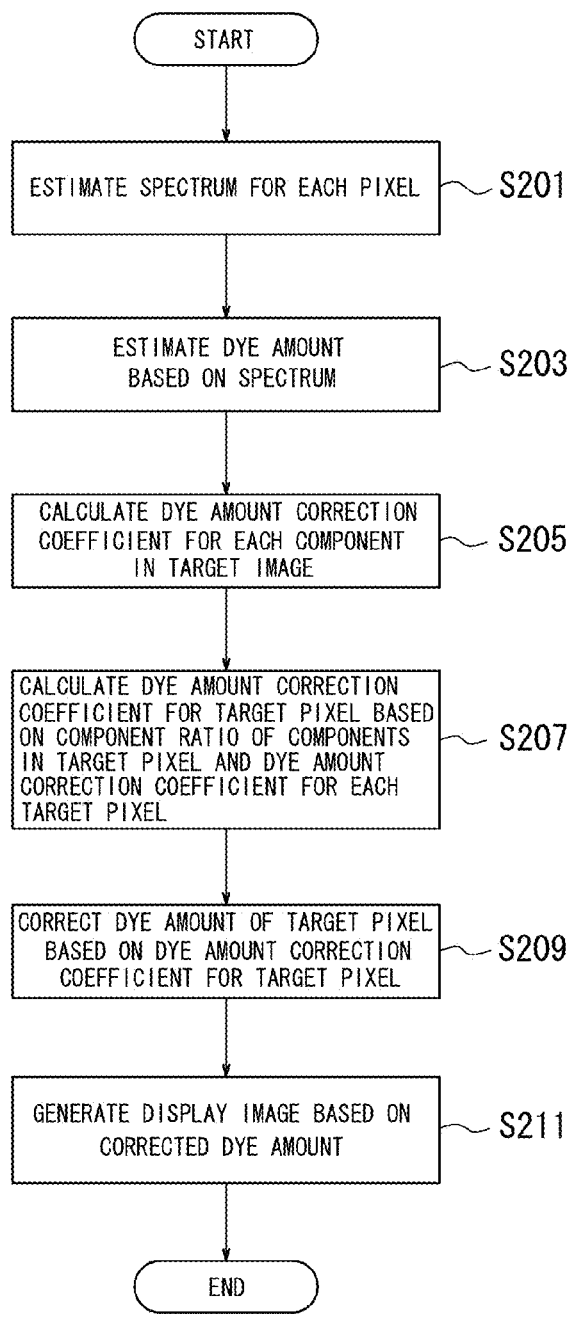
FIG. 12 is a flowchart illustrating a process of correcting a dye amount.

FIG. 12 is a flowchart illustrating a process of correcting a dye amount. First, the spectrum estimator 2505 estimates a spectrum for each pixel based on the pixel value thereof (Step S201). That is, based on Equation (5) above, the pixel value G(x) of the estimation target pixel is used to calculate an estimate value T^(x) of the spectral transmittance at a corresponding sample point of the target sample. The estimate value T^(x) thus obtained for the spectral transmittance is stored in the storage portion 230. Equation (5) is shown again below.

$$\hat{T}(x) = WG(x) \qquad (5)$$

Next, based on the estimate value T^(x) of the spectral transmittance, the dye amount estimator 2507 estimates the dye amount (Step S203). Here, the dye amount estimator 2507 estimates, based on the reference spectral characteristic of each dye used in the staining method employed for staining a target sample, the dye amount for each staining method at a sample point corresponding to an arbitrary point x on the target sample image. Specifically, based on the estimate value T^(x) of the spectral transmittance at the point x on the target sample image, each dye amount fixed to a sample point, which corresponds to the point x, of the target sample is estimated. In other words, using Equation (16) above, values for d^H, d^E, d^R are obtained. The dye amounts d^H, d^E, d^R thus estimated for the point x on the target sample value are stored in the storage portion 230. Equation (16) is shown again below.

$$\hat{d}(x) = (K^T K)^{-1} K^T \hat{A}(x) \qquad (16)$$

Next, the component correction coefficient calculator 2509 calculates, as a component correction coefficient, a dye amount correction coefficient for each component in the target sample image (Step S205). In the calculation process, first, in the aforementioned arbitrary characteristic amount space, a pixel that is closest to the average value ui of the components is selected from the target sample image. Then, the dye amount d^ is regarded as the dye amount d^(i) of a target component in the target sample image. Here, there may be selected a plurality of pixels rather than one pixel, so that the average value of the dye amounts of these pixels may be regarded as the dye amount d^(i) of a target component.

Next, using Equation (29) below, a dye amount correction coefficient coefi for each component is calculated based on the dye amount d^(i) of each component and the dye amount reference value dstd(i) of each component stored in the reference value storage portion 233. The dye amount correction coefficient coefi thus calculated is stored in the storage portion 230. The dye amount reference value dstd(i) to be stored in the reference value storage portion 233 is, for example, a dye amount of each component in an image of a normally stained sample.

$$coef_i = \frac{d_{std}(i)}{\hat{d}(i)} \qquad (29)$$

Next, using Equation (30) below, the target pixel correction coefficient calculator 2511 calculates a dye amount correction coefficient coef(x) for a target pixel x, as a target pixel correction coefficient, based on the component ratio rate(x,i) of components in the target pixel x and the dye amount correction coefficient coefi of each component in the target pixel x (Step S207). The dye amount correction coefficient coef(x) thus calculated is stored in the storage portion 230.

$$coef(x) = \sum_i (rate(x, i) * coef_i) \qquad (30)$$

Next, using Equation (31) below, the characteristic amount corrector 2513 corrects the dye amount d^(x) for the target pixel x, based on the dye amount correction coefficient coef(x) of the target pixel x (Step S209).

$$\dot{d}(x) = \hat{d}(x) * \mathrm{coef}(x) \qquad (31)$$

As a result, the dye amount is corrected based on the component ratio of components that have transmitted the light received by the target pixel x. The dye amount d*(x) thus corrected is stored in the storage portion 230.

Next, the display image generator 2515 generates a display image based on the corrected dye amount (Step S211). For this purpose, a correction spectrum is synthesized based on the corrected dye amount d*H, d*E, and dR. Then, according to Equation (21) above, a new spectral absorbance a*(x,λ) is obtained for each point x. Equation (21) is shown again below.

$$\tilde{a}^*(x,\lambda) = k_H(\lambda) \cdot \hat{d}_H^* + k_E(\lambda) \cdot \hat{d}_E^* + k_R(\lambda) \cdot \hat{d}_R \qquad (21)$$

Next, according to Equation (23) above, a new spectral transmittance t*(x,b) is obtained for each point x. Equation (23) is shown again below.

$$t^*(x,\lambda) = e^{-a^*(x,\lambda)} \qquad (23)$$

The above calculation is repeated D times in the wavelength direction, to thereby obtain T*(x). T*(x) represents a D-by-1 matrix corresponding to t*(x,λ). The T*(x) thus obtained is stored in the storage portion 230.

Thereafter, a corrected image is synthesized based on the synthesized spectral transmittance T*(x). In other words, using Equation (25) above, a new pixel value G*(x) is obtained for each point x. Equation (25) is shown again below.

$$G^*(x) = HT^*(x) \qquad (25)$$

In this manner, a pixel value G*(x) can be synthesized, which is a pixel value for a specimen having a dye amount virtually changed. The aforementioned procedure allows for virtual adjustment of dye amount of a stained specimen. The synthesized image is stored in the storage portion 230.

Next, the display 290 displays the synthesized image obtained in Step S211, which allows a user to identify the resultant image.

As described above, according to the image processing apparatus of this embodiment, the dye amount is corrected based on the component ratio of tissues, which makes it possible to correct, in keeping with the reality, the dye amount in a pixel that has received light having passed through a plurality of tissues within the depth of focus, to thereby obtain accurate image data.

Second Embodiment

Figure 13:
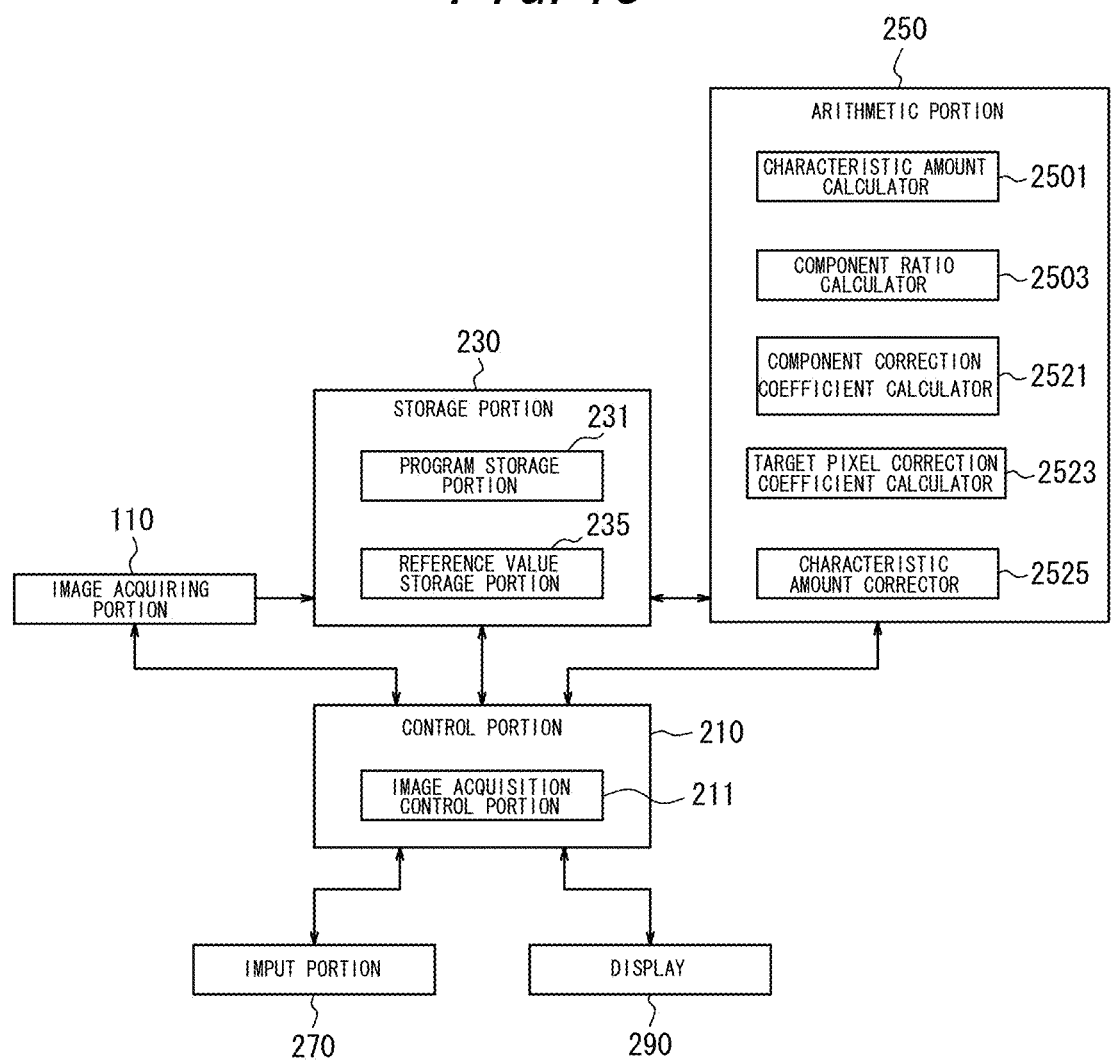
FIG. 13 is a block diagram illustrating functional configurations of main components of an image processing apparatus according to a second embodiment of the present invention.

FIG. 13 is a block diagram illustrating functional configurations of main components of an image processing apparatus according to a second embodiment of the present invention. The image processing apparatus is similar in configuration to that of the first embodiment, except in that a pixel value is directly corrected as the second characteristic amount. Therefore, the arithmetic portion 250 includes: the characteristic amount calculator 2501; the component ratio calculator 2503, a component correction factor calculator 2521; a target pixel correction factor calculator 2523; and a characteristic amount corrector 2525. Further, the storage portion 230 has a reference value storage portion 235 for a storing reference pixel value for each component in an image of a normally stained sample. The rest of the configuration is similar to that of the first embodiment, and thus the description thereof is omitted.

Hereinafter, the process to be performed by the arithmetic portion 250 is described. As described with reference to the first embodiment, the arithmetic portion 250 is first calculates, according to the flowchart of FIG. 6, the first characteristic amount for each pixel constituting an obtained target sample image by the characteristic amount calculator 2501. Then, based on the first characteristic amount thus calculated, the component ratio calculator 2503 calculates the component ratio of components within the depth of focus, the components having transmitted the light received by each pixel. Thereafter, based on the component ratio of the components thus calculated, the arithmetic portion 250 corrects a pixel value for a target pixel, the pixel value serving as the second characteristic amount.

Figure 14:
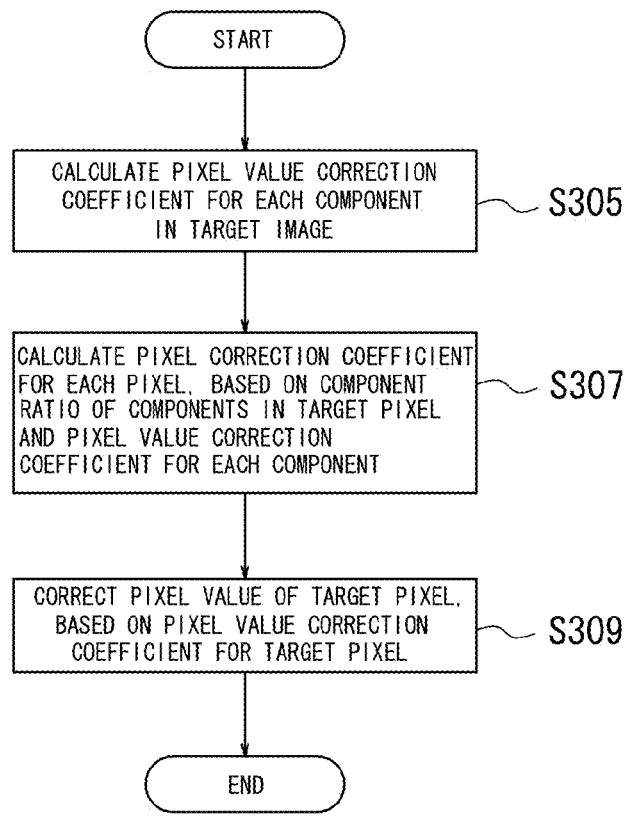
FIG. 14 is a flowchart schematically illustrating a process of correcting a pixel value performed by the image processing apparatus of FIG. 13.

FIG. 14 is a flowchart illustrating the process of correcting the pixel value. First, the component correction coefficient calculator 2521 calculates, as a component correction coefficient, a pixel value correction coefficient for each component in a target image, based on reference pixel values of the components stored in the reference value storage portion 235 and an average value of the pixel values of the components (Step S305). This process of calculating the component correction coefficient may be similarly carried out in the dye amount correction coefficient calculating process of Step S205 of FIG. 12, for example, by replacing the dye amount with the pixel value.

Next, the target pixel correction coefficient calculator 2523 calculates, as the target pixel correction coefficient, a pixel value correction coefficient for a target pixel, based on the component ratio of components in a target pixel calculated by the component ratio calculator 2503 and on the component correction coefficient calculated by the component correction coefficient calculator 2521 (Step S307). This process of calculating the target pixel correction coefficient may be similarly carried out in the target pixel correction coefficient calculating process of Step S207 of FIG. 12, for example, by replacing the dye amount with the pixel value.

After that, the characteristic amount corrector 2525 corrects the pixel value of a target pixel, based on the target pixel correction coefficient calculated by the target pixel correction coefficient calculator 2523 (Step S309). This process of correcting the pixel value of the target pixel may be similarly carried out in the target pixel die amount correction process of Step S209 of FIG. 12, for example, by replacing the dye amount with the pixel value.

As a result, the pixel value is corrected based on the component ratio of components that have transmitted the light received by the target pixel. Then, the display 290 displays an image based on the pixel values corrected in Step S309, which allows a user to identify a resultant image.

According to the image processing apparatus of this embodiment, similarly to the first embodiment, a pixel value serving as the second characteristic amount is directly corrected based on the component ratio of tissues. Therefore, even in a pixel that has received light having passed through a plurality of tissues within the depth of focus, the pixel value can be readily corrected with ease in keeping with the reality, to thereby obtain accurate image data.

Third Embodiment

Figure 15:
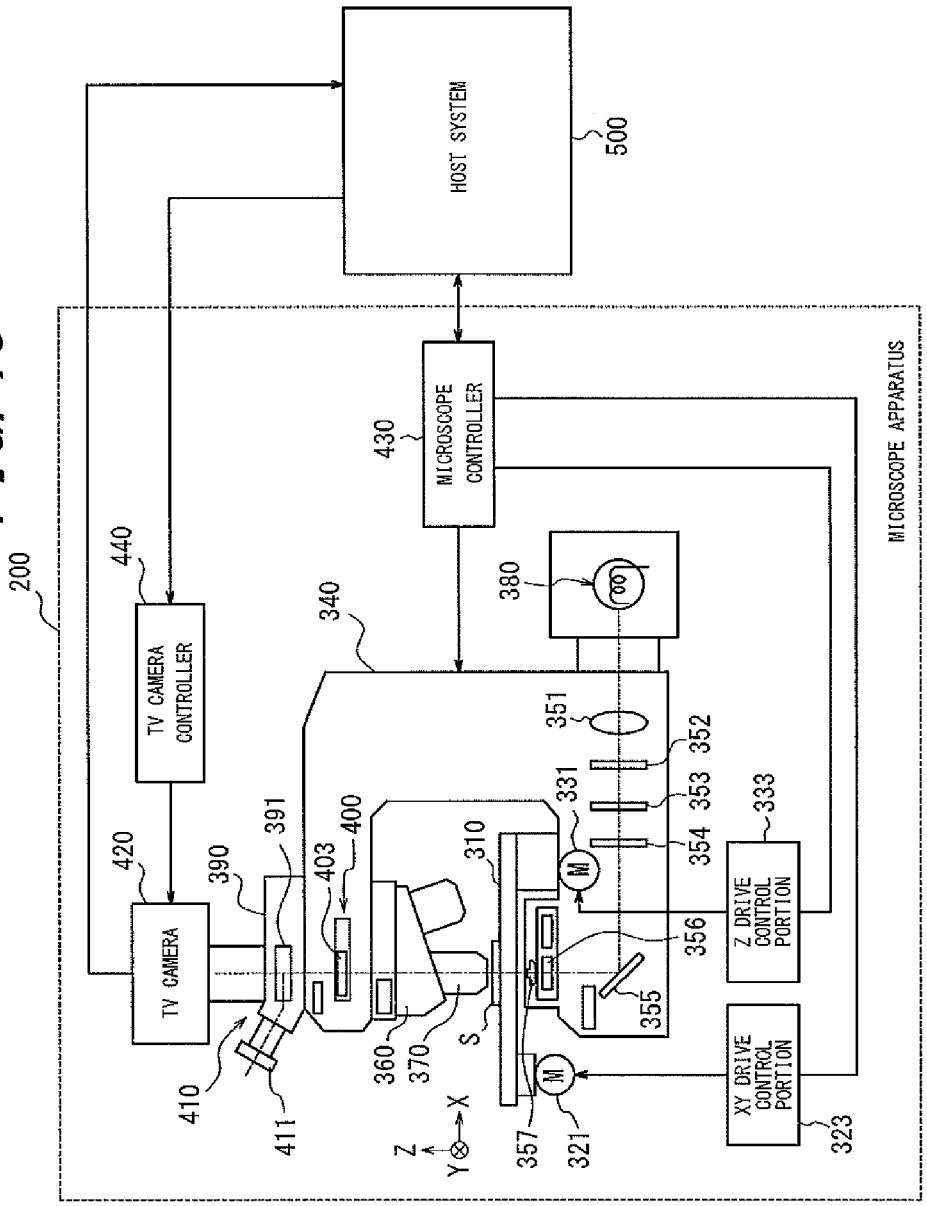
FIG. 15 is a block diagram illustrating functional configurations of main components of a virtual microscope system according to a third embodiment of the present invention.

FIG. 15 is a block diagram illustrating functional configurations of main components of a virtual microscope system according to a third embodiment of the present invention. The virtual microscope system serves to acquire a virtual slide image of a stained sample, and includes a microscope apparatus 200 and a host system 500.

The microscope apparatus 200 includes: a microscope main body 340 having a substantially U shape in side view; a light source 380 disposed in the rear at the bottom of the microscope main body 340; and a lens barrel 390 placed on top of the microscope main body 340. The microscope main body 340 supports an electrically-driven stage 310 onto which a target sample S is to be placed while holding an objective lens 370 via a revolver 360. The lens barrel 390 is provided with a binocular portion 410 for visually observing a sample image of a target sample S and a TV camera 420 for capturing a sample image of the target sample S. In other words, the microscope apparatus 200 corresponds to the image acquiring portion 110 of FIG. 1. Here, the optical axis direction of the objective lens 370 is defined as Z direction, and a plane perpendicular to the Z direction is defined as XY plane.

The electrically-driven stage 310 is configured to be movable in the X, Y, and Z directions. In other words, the electrically-driven stage 310 is made movable within the XY plane by a motor 321 and an XY drive control portion 323 for controlling the drive of the motor 321. The XY drive control portion 323 detects a predetermined origin position of the electrically-driven stage 310 in the XY plane by an XY position origin sensor under the control of a microscope controller 430, and controls a drive amount of the motor 321, with the origin position as the base point, to thereby shift an observation point on the target sample S. The XY drive control portion 323 outputs, as appropriate, the X position and the Y position of the electrically-driven stage 310 during observation, to the microscope controller 430.

The electrically-driven stage 310 is movable in the Z direction by a motor 331 and a Z drive control portion 333 for controlling the drive of the motor 331. The Z drive control portion 333 detects a predetermined origin position of the electrically-driven stage 310 in the Z direction by a Z position origin sensor, which is not shown, under the control of the microscope controller 430, and controls a drive amount of the motor 331, with the origin position as the base point, to thereby focus-adjustingly shift the target sample S to an arbitrary Z position within a predetermined height range. The Z drive control portion 333 outputs, as appropriate, the Z position of the electrically-driven stage 310 during observation, to the microscope controller 430.

The revolver 360 is held rotatable relative to the microscope main body 340, and disposes the objective lens 370 above the target sample S. The objective lens 370 is detachably mounted on the revolver 360 together with other objective lenses having different magnifications (observation magnifications), and shifted to be located on the optical path of observation light in accordance with the rotation of the revolver 360, so that an objective lens 370 for use in observation of the target sample S may be selectively switched.

The microscope main body 340 includes, at the bottom portion therein, an illumination optical system for transilluminating the target sample S. The illumination optical system includes: a collector lens 351 for collecting illumination light emitted from the light source 380; an illumination system filter unit 352; a field stop 353; an aperture stop 354; a fold mirror 355 for deflecting the optical path of the illumination light along the optical path of the objective lens 370; a condenser optical element unit 356; a top lens unit 357; and the like, which are disposed at appropriate positions along the optical path of illumination light. Illumination light emitted from the light source 380 is irradiated onto the target sample S by the illumination optical system and transmitted light from the sample is incident on the objective lens 370 as observation light. Therefore, the light source 380 and the illumination optical system correspond to the illuminating portion 140 of FIG. 2.

Further, the microscope main body 340 includes therein a filer unit 400 in the upper portion thereof. The filter unit 400 holds at least two optical filters 403 rotatable to limit a wavelength region of light to be imaged as a sample image to a predetermined range. The optical filter 403 is shifted as appropriate to be located on the optical path of observation light downstream of the objective lens 370. The filter unit 400 corresponds to the filter portion 113 of FIG. 10. Although exemplified herein is a case where the optical filter 403 is disposed downstream of the objective lens 370, the present embodiment is not limited thereto and the optical filter 403 may be disposed at any position along the optical path leading to the TV camera 420 from the light source 380. The observation light passing through the objective lens 370 is incident on the lens barrel 390 via the filter unit 400.

The lens barrel 390 includes therein a beam splitter 391 for switching the optical path of the observation light from the filter unit 400 to introduce the light into the binocular portion 410 or the TV camera 420. A sample image of the target sample S is introduced into the binocular portion 410 by the beam splitter 391 and visually observed by an operator via an eyepiece lens 411. Alternatively, the sample image of the target sample S is imaged by the TV camera 420. The TV camera 420 is provided with an image sensor such as a CCD or a CMOS for capturing a sample image (specifically, a sample image within the visual range of the objective lens 370), so as to capture a sample image and output the image data of the sample image to the host system 500. That is, the TV camera 420 corresponds to the RGB camera 111 of FIG. 10.

Further, the microscope apparatus 200 includes a microscope controller 430 and a TV camera controller 440. The microscope controller 430 comprehensively controls operations of the respective components constituting the microscope apparatus 200 under the control of the host system 500. For example, the microscope controller 430 carries out various adjustments of the respective component of the microscope apparatus 200 in association with observation of the target sample S, the adjustments including: a process of rotating the revolver 360 to switch one objective lens 370 disposed on the optical path of observation light to another objective lens; light-adjusting control of the light source 380 and/or switching of various optical elements in accordance with the magnification or the like of the objective lens 370 thus switched; instructions to the XY drive control portion 323 and/or the Z drive control portion 333 to move the electrically-driven stage 310; and the like. The microscope controller 430 also notifies the host system 500 of the states of the respective components as appropriate.

The TV camera controller 440 drives the TV camera 420 by carrying out ON/OFF switching of automatic gain control, setting of gain, ON/OFF switching of automatic exposure control, setting of exposure time, and the like, under the control of the host system 500, to thereby control the image capturing operation of the TV camera 420.

Meanwhile, the host system 500 includes the input portion 270, the display 290, the arithmetic portion 250, the storage portion 230, and the control portion 210 for controlling each component of the apparatus, which are illustrated in FIG. 1 or FIG. 13. The host system 500 can be realized by a known hardware structure including: CPU and video board; a main storage device such as a main memory (RAM); an external storage device such as a hard disk and various memory media; a communication device; an output device such as a display device and a printing device; an input device; and an interface device for effecting connection with an external input. Therefore, for example, a general purpose computer such as a work station and a personal computer can be employed as the host system 500.

The virtual microscope system according to this embodiment controls the operations of respective components including the microscope apparatus 200, according to the image processing program including a VS image generation program stored in the storage portion of the host system 500. As a result, the TV camera 420 of the microscope apparatus 200 subjects the target sample S to partial multiband imaging so as to obtain a plurality of target sample images, which are each processed as described above with reference to the first and second embodiments, to thereby generate a virtual slide (VS) image. Here, the VS image is obtained by piecing together one or more images obtained through multiband imaging by the microscope apparatus 200. For example, a plurality of high-resolution images of the target sample S are captured for each part thereof by using a high-power objective lens 370, and those images are pieced together, to thereby generate a VS image. The VS image refers to a wide-field and high-definition multiband image reflecting the entire area of the target sample S.

Therefore, according to the virtual microscope system of this embodiment, there may be produced the same effects similar to those obtained with the image processing apparatus described with reference to the first or second embodiment.

The present invention is not limited to the above-mentioned embodiments, and may be subjected to various modifications and alterations. For example, according to the aforementioned embodiments, a pixel value in the R band is calculated as the first characteristic amount while correcting the dye amount or pixel value to obtain the second characteristic amount. However, the first characteristic amount and the second characteristic amount may be the same. Alternatively, a dye amount or a pixel value may be calculated as the first characteristic amount while correcting the pixel value in the R band as the second characteristic amount. Further, in the aforementioned embodiments, a multiband image having 6 bands is acquired. However, the characteristic amount can also be obtained by acquiring an arbitrary multiband image having at least 4 bands, or by acquiring an image of 3 bands of RGB.

Further, the present invention is not limited to the image processing apparatus or the virtual microscope system described above, and may be implemented by an image processing method, an image processing program, and a storage medium storing the program, which are for substantially carrying out those processes. Therefore, it should be understood that the method, the program, and the medium described above may also be embodied by the present invention.

REFERENCE SIGNS LIST

110 image acquiring portion
111 RGB camera
113 filter portion
120 imaging lens
130 light receiving position moving portion
131 target sample
140 illuminating portion
200 microscope apparatus
210 control portion
230 storage portion
233, 235 reference value storage portion
250 arithmetic portion
270 input portion
290 display
500 host system
2501 characteristic amount calculator
2503 component ratio calculator
2505 spectrum estimator
2507 dye amount estimator
2509, 2521 component correction coefficient calculator
2511, 2523 target pixel correction coefficient calculator
2513, 2525 characteristic amount corrector
2515 display image generator

The invention claimed is:

1. An image processing apparatus for processing a stained sample image obtained by imaging a stained sample, the image processing apparatus comprising:
   a processor comprising hardware configured to implement:
      a characteristic amount calculator for calculating a first characteristic amount for each pixel constituting the stained sample image; and
      a component ratio calculator for, based on the first characteristic amount calculated by the characteristic amount calculator:
         calculating a distance of each of the components representing a distance between the target pixel and each of the components in the first characteristic amount;
         totalizing the distance of each of the components for all of the components of the target pixel to calculate a distance of all of the components; and
         calculating a component ratio of each of the components in the target pixel by calculating a ratio of the distance of each of the components to the distance of all of the components for all of the components of the target pixel; and
   a reference value storage medium for storing a reference value of a second characteristic amount for each of the components;
   the processor being further configured to implement:
      a component correction coefficient calculator for calculating a component correction coefficient representing a correction coefficient for the second characteristic amount of each of the components, based on the second characteristic amount of each of the components and the reference value thereof stored in the reference value storage medium;
      a target pixel correction coefficient calculator for calculating, based on the component ratio calculated by the component ratio calculator and the component correction coefficient calculated by the component correction coefficient calculator, a target pixel correction coefficient representing a correction coefficient for the second characteristic amount of the target pixel by multiplying the component ratio and the component correction coefficient together for each of the components of the target pixel to calculate a component-owned correction coefficient representing a correction coefficient owned by each of the components of the target pixel for the second characteristic amount and totalizing the component-owned correction coefficient of all of the components of the target pixel; and
      a characteristic amount corrector for correcting the second characteristic amount of the target pixel, based on the target pixel correction coefficient calculated by the target pixel correction coefficient calculator.

2. The image processing apparatus according to claim 1, wherein the component ratio calculator calculates the component ratio of the components, based on the Euclidean distance between a target pixel and each of the components, in a predetermined characteristic amount space of the first characteristic amount in the stained sample image.

3. The image processing apparatus according to claim 1, wherein the component ratio calculator calculates the component ratio of the components, based on the Mahalanobis distance between a target pixel and each of the components, in a predetermined characteristic amount space of the first characteristic amount in the stained sample image.

4. The image processing apparatus according to claim 1, wherein the processor is further configured to implement a dye amount estimator for estimating a dye amount in each pixel constituting the stained sample image,
wherein the reference value storage medium stores a dye amount reference value for each of the components,
wherein the component correction coefficient calculator calculates, as the component correction coefficient, a correction coefficient for the dye amount of each of the components, based on the dye amount estimated by the dye amount estimator and the dye amount reference value stored in the reference value storage medium,
wherein the target pixel correction coefficient calculator calculates, as the target pixel correction coefficient, a correction coefficient for the dye amount of the target pixel, based on the component ratio calculated by the component ratio calculator and the component correction coefficient calculated by the component correction coefficient calculator, and
wherein the characteristic amount corrector corrects the dye amount of the target pixel, based on the target pixel correction coefficient calculated by the target pixel correction coefficient calculator.

5. The image processing apparatus according to claim 4, wherein the reference value storage medium stores the dye amount of each of the components in an image of a normally stained sample, as the dye amount reference value.

6. The image processing apparatus according claim 4, wherein the processor is further configured to implement a display image generator for generating a display image, based on the dye amount corrected by the characteristic amount corrector.

7. The image processing apparatus according to claim 4, wherein the processor is further configured to implement an optical spectrum estimator for estimating an optical spectrum based on a pixel value of the stained sample image,
wherein the dye amount estimator estimates a dye amount in each pixel constituting the stained sample image, based on the optical spectrum estimated by the optical spectrum estimator.

8. The image processing apparatus according to claim 1, wherein the second characteristic amount is a pixel value,
wherein the reference value storage medium stores a reference pixel value of each of the components,
wherein the component correction coefficient calculator calculates, as the component correction coefficient, a correction coefficient for a pixel value of each of the components, based on the pixel value of each of the components and the reference pixel value stored in the reference value storage medium,
wherein the target pixel correction coefficient calculator calculates, as the target pixel correction coefficient, a correction coefficient for the pixel value of the target pixel, based on the component ratio calculated by the component ratio calculator and the component correction coefficient calculated by the component correction coefficient calculator, and
wherein the characteristic amount corrector corrects the pixel value of the target pixel, based on the target pixel correction coefficient calculated by the target pixel correction coefficient calculator.

9. An image processing method of processing a stained sample image obtained by imaging a stained sample, the method comprising the steps of:
calculating a first characteristic amount for each pixel constituting the stained sample image;
performing, based on the first characteristic amount thus calculated, the steps of:
calculating a distance of each of the components representing a distance between the target pixel and each of the components in the first characteristic amount;
totalizing the distance of each of the components for all of the components of the target pixel to calculate a distance of all of the components; and
calculating a component ratio of each of the components in the target pixel by calculating a ratio of the distance of each of the components to the distance of all of the components for all of the components of the target pixel;
calculating a component correction coefficient representing a correction coefficient for a second characteristic amount of each of the components, based on the second characteristic amount of each of the components and a reference value of the second characteristic amount;
calculating, based on the component ratio and the component correction coefficient thus calculated, a target pixel correction coefficient representing a correction coefficient for the second characteristic amount of the target pixel by multiplying the component ratio and the component correction coefficient together for each of the components of the target pixel to calculate a component-owned correction coefficient representing a correction coefficient owned by each of the components of the target pixel for the second characteristic amount and totalizing the component-owned correction coefficient of all of the components of the target pixel; and
correcting the second characteristic amount of the target pixel, based on the target pixel correction coefficient thus calculated.

10. A non-transitory computer-readable medium having stored thereon an image processing program for processing a stained sample image obtained by imaging a stained sample, the program causing a computer to execute the processes of:
calculating a first characteristic amount for each pixel constituting the stained sample image;
performing, based on the first characteristic amount thus calculated, the steps of:
calculating a distance of each of the components representing a distance between the target pixel and each of the components in the first characteristic amount;
totalizing the distance of each of the components for all of the components of the target pixel to calculate a distance of all of the components; and
calculating a component ratio of each of the components in the target pixel by calculating a ratio of the distance of each of the components to the distance of all of the components for all of the components of the target pixel;
calculating a component correction coefficient representing a correction coefficient for a second characteristic amount of each of the components, based on the second characteristic amount of each of the components and a reference value of the second characteristic amount;

calculating, based on the component ratio and the component correction coefficient thus calculated, a target pixel correction coefficient representing a correction coefficient for the second characteristic amount of the target pixel by multiplying the component ratio and the component correction coefficient together for each of the components of the target pixel to calculate a component-owned correction coefficient representing a correction coefficient owned by each of the components of the target pixel for the second characteristic amount and totalizing the component-owned correction coefficient of all of the components of the target pixel; and correcting the second characteristic amount of the target pixel, based on the target pixel correction coefficient thus calculated.

* * * * *